S. NEWBOLD.
METAL CUTTING TOOL.
APPLICATION FILED DEC. 4, 1907.
899,608.
Patented Sept. 29, 1908.
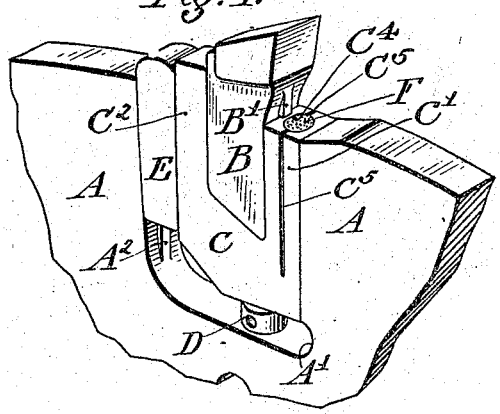
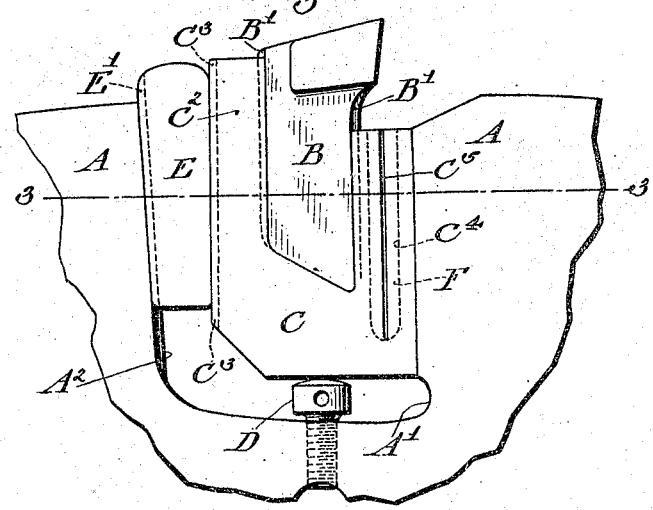
WITNESSES:
INVENTOR
Sidney Newbold
BY
ATTORNEY

UNITED STATES PATENT OFFICE.

SIDNEY NEWBOLD, OF PHILADELPHIA, PENNSYLVANIA.

METAL-CUTTING TOOL.

No. 899,608.

Specification of Letters Patent.

Patented Sept. 29, 1908.

Application filed December 4, 1907. Serial No. 405,027.

*To all whom it may concern:*

Be it known that I, SIDNEY NEWBOLD, a citizen of the United States of America, residing in the city and county of Philadelphia, in the State of Pennsylvania, have invented a certain new and useful Improvement in Metal-Cutting Tools, of which the following is a true and exact description, reference being had to the accompanying drawings, which form a part thereof.

The present invention relates to devices for adjustably clamping metal cutting tools or cutters proper in their holders; and is particularly applicable for use in securing removable cutters or teeth in saw blades, though well adapted also for securing removable cutting tools in other varieties of holding devices.

The object of the invention is the provision of simple and efficient means for clamping the tools in the holders in such manner that the tools may be readily removed and replaced or adjusted from time to time and may be secured in place with the desired rigidity after each adjustment or replacement.

In particular, the object of the invention is to provide clamping means so arranged that any deformation in the holding parts, occurring from the repeated shocks to which the tools may be subjected may be readily compensated for from time to time. This object I obtain by including in the clamping means a thrust block divided into two parts and provided with a soft metal filling between the two parts of the block which may be tamped to spread the parts of the block as conditions require.

The various features of novelty which characterize the invention are pointed out with particularity in the claims annexed to and forming a part of this specification. For a better understanding of the invention, however, and the advantages possessed by it, reference may be had to the accompanying drawings and descriptive matter in which I have illustrated and described one of the forms in which it may be embodied.

Of the drawings, Figure 1 is a perspective view of a portion of a rotary metal cutting saw provided with removable saw teeth. Fig. 2 is an elevation of the same saw portion, and Fig. 3 is a sectional plan taken on the line 3—3 of Fig. 2.

In the drawings, A represents the tool holder or saw blade proper, which is provided with a cavity A' for each removable tooth. The saw tooth B, which may well be made of "high speed" steel is machined to fit a correspondingly shaped socket or space between the front and rear legs C' and C² of a supplemental or auxiliary U shaped tool holder C. The radial position of the cutter B may be regulated by an adjustable bolt D threaded into the saw blade A at the bottom of the cavity A' and having its head serving as an abutment against which the inner edge of the supplemental holder C bears. The parts are clamped in position after the screw D is adjusted as desired by driving a wedge E into place between the rear wall or edge of cavity A' and the rear leg C² of the auxiliary holder C. By preference, the adjacent edges of the cavity A', wedge E, auxiliary cutter holder C, and cutter or saw teeth B are provided with interlocking tongues and grooves. For instance, the front and rear edges of the cavity A' are formed with tongues A², the wedge E with a groove E' and a tongue E², the edges of the legs C' and C² with grooves C³, and the cutter B with tongues B'.

In the form of the invention disclosed, the front leg C' of the holder C forms the two part thrust block, being slitted between its front and rear edges from its outer end to a point adjacent its inner end. The division of the leg into two parts is made by a substantially radial hole C⁴ drilled in the leg and diametrically opposed kerfs C⁵ extending from the hole C⁴ to the side faces of the leg.
A soft metal filling F is inserted in the hole C⁴. With this arrangement the front and rear edges of the supplemental holder can be brought into the proper relation from time to time by tamping the filling of soft metal in the hole C⁴ and thereby expanding the two bifurcations of the front leg of the auxiliary holder. This operation may well be carried out in a vise or tool setting device provided with a cavity fitted to the proper dimensions of the holder, so that by a suitable tamping of the soft metal filling F the front and rear edges of the holder C can be given the exact relation desired, and the tool may thereafter be properly secured in place by driving the wedge or key E home.

I have found that with parts shaped as shown in the drawings there is but little, if any greater, tendency for the legs of the supplemental holder to be deformed when the front leg is slitted and filled with soft metal than when this leg is made solid, since when the kerfs C⁵ are thin, as they should be, the elongated pencil like filling F of soft metal is but difficultly compressible under pressure applied to the front and rear edges of the leg C'. This notwithstanding the fact that the leg C' may be readily expanded by tamping the filling F at its upper end. Whether the leg is slitted and provided with a socket for the soft metal filling or is made solid, it is practically impossible to avoid some drawing together of the outer ends of the leg edges of the supplemental holder under the repeated shocks incident to use. With the present invention, however, this may be easily compensated for from time to time by tamping the soft metal filling to expand the two part front leg; at the same time the soft metal filling F provides a sort of cushion for the saw tooth, which practice has demonstrated that it is highly desirable for such a tooth to have.

Having now described my invention, what I claim as new and desire to secure by Letters Patent is:

1. The combination with a cutter holder having a cavity and a removable cutter of means for clamping the cutter or tooth in place in said cavity, including a two part thrust block and a soft metal filling between the two parts of the thrust block.

2. The combination with a cutter holder having a cavity and a removable cutter, of means for clamping the cutter in place in said cavity, including a thrust block divided into two parts by a hole extending into it from its outer end and diametrically opposed thin kerfs extending from the hole to the side faces of the block, and a soft metal filling tamped in place in said hole.

3. The combination with a rotary cutter holder having a cavity and a removable cutter, of a U shaped supplemental holder between the legs of which the cutter is received, a wedge for clamping said auxiliary cutter holder with the inserted cutter in place in said cavity, the outer end of one leg of the auxiliary holder being divided into two parts by a slit extending lengthwise of and between the front and rear edges of said leg, and a soft metal filling inserted in said slit.

4. The combination with a rotary cutter holder having a cavity and a removable cutter, of a U shaped supplemental holder between the legs of which the cutter is received, a wedge for clamping said auxiliary cutter holder with the inserted cutter in place in said cavity, the outer end of one leg of the auxiliary holder being divided into two parts by a slit extending lengthwise of and between the front and rear edges of said leg, and a soft metal filling inserted in said slit, the meeting edges of said cavity in the main cutter holder, the wedge, the legs of the auxiliary cutter holder, and the cutter being provided with interlocking tongues and grooves.

SIDNEY NEWBOLD.

Witnesses:
C. W. COLEMAN,
C. S. BARTON.